United States Patent
Wang et al.

(10) Patent No.: US 8,600,793 B2
(45) Date of Patent: Dec. 3, 2013

(54) METHOD AND SYSTEM FOR MANAGING AN ENTERPRISE RESOURCE PLANNING PROJECT

(75) Inventors: Liang Wang, Shanghai (CN); Lei Chen, Shanghai (CN); Xu Fang, Shanghai (CN); Li Bowen, Shanghai (CN)

(73) Assignee: SAP AG, Walldorf (DE)

( * ) Notice: Subject to any disclaimer, the term of this patent is extended or adjusted under 35 U.S.C. 154(b) by 1614 days.

(21) Appl. No.: 11/636,117

(22) Filed: Dec. 6, 2006

(65) Prior Publication Data

US 2008/0140490 A1 Jun. 12, 2008

(51) Int. Cl.
*G06Q 10/00* (2012.01)

(52) U.S. Cl.
USPC ....... 705/7.15; 705/7.11; 705/7.12; 705/7.13; 705/7.23; 705/7.38; 705/7.39

(58) Field of Classification Search
USPC .................................................. 705/8, 7.15
See application file for complete search history.

(56) References Cited

U.S. PATENT DOCUMENTS

| | | | |
|---|---|---|---|
| 6,938,240 B2 * | 8/2005 | Charisius et al. | 717/104 |
| 7,058,587 B1 * | 6/2006 | Horne | 705/7 |
| 7,774,220 B2 * | 8/2010 | Sullivan et al. | 705/7 |
| 2002/0078432 A1 * | 6/2002 | Charisius et al. | 717/102 |
| 2002/0107914 A1 * | 8/2002 | Charisius et al. | 709/203 |
| 2002/0194046 A1 * | 12/2002 | Sullivan et al. | 705/8 |
| 2003/0065546 A1 * | 4/2003 | Gorur et al. | 705/9 |
| 2004/0143475 A1 * | 7/2004 | Kilburn et al. | 705/8 |
| 2004/0172318 A1 * | 9/2004 | Shen | 705/7 |
| 2005/0159990 A1 * | 7/2005 | Barrett | 705/8 |
| 2007/0239501 A1 * | 10/2007 | Cunningham et al. | 705/7 |
| 2008/0103871 A1 * | 5/2008 | Ruehl et al. | 705/9 |
| 2008/0109287 A1 * | 5/2008 | Ganapathy et al. | 705/7 |

OTHER PUBLICATIONS

Clark, Linda Eiland; "A Stitch in Time"; Intelligent Enterprise; Oct. 20, 2000; 3, 16; pp. 52-55.*
Bajwa, Deepinder S; Mooney, Timothy; Garcia, Joseph E; "An Integrative Framework for the Assimilation of Enterprise Resource Planning Systems"; The Journal of Computer Information Systems; Spring 2004; 44, 3; pp. 81-90.*

* cited by examiner

*Primary Examiner* — Leland Marcus
(74) *Attorney, Agent, or Firm* — Mintz Levin Cohn Ferris Glovsky and Popeo, P.C.

(57) ABSTRACT

A project management server automatically monitors the progress of an Enterprise Resource Planning (ERP) project represented by developing business configuration content for the ERP system. The project management server maintains a set of data representing a previous status of the development of business configuration content for the ERP system. The project management server requests a new set of data from the ERP system. The new set of data represents the current status of the development of business configuration content for the ERP system. The project management server automatically compares the two sets of data to determine the progress of the ERP project, generates a report showing the progress and updates the old set of data with the new set of data.

10 Claims, 10 Drawing Sheets

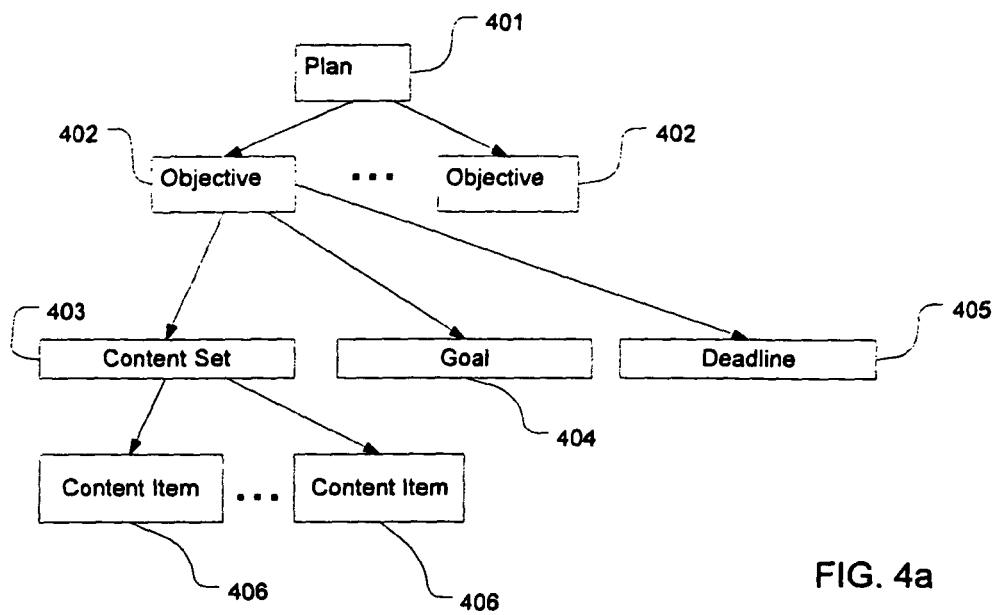
FIG. 4a
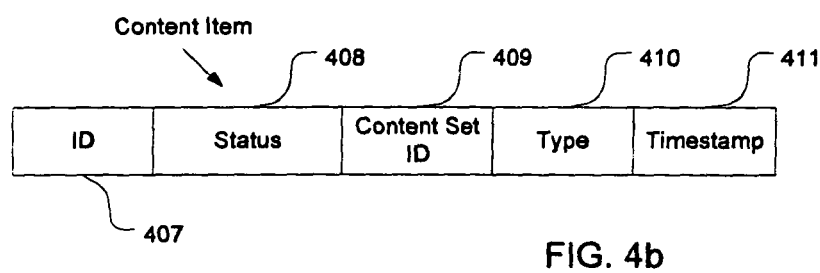
FIG. 4b
Mapping Table
412
| Content Item to be identified in the ERP system | Content Item ID |
|---|---|
|  |  |
|  |  |
|  |  |
FIG. 4c

|  |  | AUG PLAN |  | SEP PLAN |  | OCT PLAN |  | NOV PLAN |  |
| --- | --- | --- | --- | --- | --- | --- | --- | --- | --- |
| Scoping Content | Business Package | 49 | 100.00% | 49 | 100.00% | 49 | 100.00% | 49 | 100.00% |
|  | Business Topic | 203 | 100.00% | 203 | 100.00% | 203 | 100.00% | 203 | 100.00% |
|  | Business Option (FT excluded) | 871 | 100.00% | 871 | 100.00% | 871 | 100.00% | 871 | 100.00% |
|  | Fine Tuning Option | 573 | 100.00% | 573 | 100.00% | 573 | 100.00% | 573 | 100.00% |
|  | Constraint | 827 | 100.00% | 827 | 100.00% | 827 | 100.00% | 827 | 100.00% |
|  | Default Values | 480 | 100.00% | 480 | 100.00% | 480 | 100.00% | 480 | 100.00% |
|  | Scenario | 13 | 100.00% | 14 | 100.00% | 14 | 100.00% | 14 | 100.00% |
|  | Work Center | 45 | 100.00% | 45 | 100.00% | 45 | 100.00% | 45 | 100.00% |
| Configuration Content | A1S BC Set Definition | 862 | 55.00% | 785 | 65.00% | 961 | 80.00% | 1201 | 100.00% |
|  | CRM | 171 | 55.00% | 202 | 65.00% | 249 | 80.00% | 311 | 100.00% |
|  | FIN | 179 | 55.00% | 211 | 65.00% | 260 | 80.00% | 325 | 100.00% |
|  | FND | 26 | 55.00% | 35 | 65.00% | 38 | 80.00% | 48 | 100.00% |
|  | HCM | 34 | 55.00% | 40 | 65.00% | 49 | 80.00% | 61 | 100.00% |
|  | PRO | 1 | 55.00% | 1 | 65.00% | 2 | 80.00% | 2 | 100.00% |
|  | SCM | 78 | 55.00% | 92 | 65.00% | 113 | 80.00% | 141 | 100.00% |
|  | SRM | 17 | 55.00% | 20 | 65.00% | 24 | 80.00% | 30 | 100.00% |
|  | Globalization | 137 | 55.00% | 162 | 65.00% | 199 | 80.00% | 249 | 100.00% |
|  | Cros Dev | 19 | 55.00% | 22 | 65.00% | 27 | 80.00% | 34 | 100.00% |
|  | A1S BC Set Creation | 862 | 55.00% | 900 | 65.00% | 1081 | 80.00% | 1201 | 100.00% |
|  | AP BC Set Definition | 0 | 0.00% | 0 | 0.00% | 0 | 0.00% | 0 | 0.00% |
|  | AP BC Set Creation | 0 | 0.00% | 0 | 0.00% | 0 | 0.00% | 0 | 0.00% |
|  | Technical Settings | 0 | 0.00% | 0 | 0.00% | 468 | 100.00% | 468 | 100.00% |
|  | DM / MD Template | 0 | 0.00% | 0 | 0.00% | 200 | 100.00% | 200 | 100.00% |
| Content Assignment | BC Set Assignment | 862 | 55.00% | 781 | 65.00% | 778 | 80.00% | 1201 | 100.00% |
|  | PVT Assignment | 0 | 0.00% | 0 | 0.00% | 0 | 0.00% | 0 | 0.00% |
|  | FORM/REPORT Assignment | 0 | 0.00% | 0 | 0.00% | 0 | 0.00% | 0 | 0.00% |
| KT Raw material | KT – Business Package | 27 | 55.10% | 37 | 75.51% | 46 | 93.88% | 49 | 100.00% |
|  | KT – Business Topic | 104 | 51.23% | 148 | 72.91% | 190 | 93.60% | 203 | 100.00% |
|  | KT – Business Option (FT exclu | 127 | 23.96% | 290 | 55.85% | 462 | 87.17% | 530 | 100.00% |
|  | KT – Fine Tuning Option | 0 | 0.00% | 0 | 0.00% | 0 | 0.00% | 0 | 0.00% |

METHOD AND SYSTEM FOR MANAGING AN ENTERPRISE RESOURCE PLANNING PROJECT

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

At least one embodiment of the present invention pertains to project management, and more particularly, to managing an Enterprise Resource Planning (ERP) project.

BACKGROUND

As Enterprise Resource Planning (ERP) methodology has become more popular, software applications have emerged to help business managers implement ERP in business activities such as inventory control, order tracking, customer service, finance and human resources, etc. An ERP project generally involves developing business configuration content according to a customer's business requirements.

Typically, conventional project management systems require a user (a project manager, for example) to manually update relevant entries in a project management system to reflect a progress of the project development. If a project involves complicated tasks, such as an ERP project, it takes a lot of time and effort to manually update progresses of a project. In addition, manually updating relevant entries may easily introduce errors into the project management systems.

SUMMARY OF THE INVENTION

The present invention includes a method and system for managing an Enterprise Resource Planning project. The method includes requesting a first set of data from an Enterprise Resource Planning (ERP) system via an interconnect. The first set of data represents a current status of the content entities in the ERP system. The method further includes generating a report indicating a progress of a project based on the first set of data in view of a second set of data maintained at a project management server. The second set of data represents a previous status of the content entities in the ERP system.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4a is a block diagram illustrating an example of a data structure of an objective;

FIG. 4b is a block diagram illustrating an example of a data structure of a content entity shown in FIG. 4a;

FIG. 4c is a block diagram illustrating an example of a mapping table which maps a content entity maintained at the Project Management Server (PMS) shown in FIG. 1 and a corresponding content entity maintained at the ERP system shown in FIG. 1;

FIG. 7 is a diagram illustrating a Graphic User Interface (GUI) of a client-side management application for managing a project plan;

FIG. 10 is a diagram illustrating an example of a report generated by the PMS shown in FIG. 1.

DETAILED DESCRIPTION

A method and system for managing an Enterprise Resource Planning project are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Generally, one of the major tasks of an ERP project is developing business configuration content according to a customer's business requirements. Thus, the development of the content indicates the progress of the ERP project. Business configuration content is represented as a number of content entities. Each content entity represents a specific business configuration content that needs to be developed in the project according to the. customer's business requirements. A number of content entities may be organized together to form a content category according to the content's type. In addition, business configuration content includes multiple content categories. An example of business configuration content is Business Configuration (BC) set. A BC Set consists of customizing settings that can be used multiple times to recreate or modify a database. In one example, a BC Set is an XML file whose structure is determined by a schema file. A BC Set defines the value for each node's attributes in the XML file and load these values into tables in ERP system.

An embodiment of the present invention includes a technique of automatically managing an Enterprise Resource Planning (ERP) project. According to one embodiment, the current status of each content entity is compared with the status of the corresponding content entity recorded previously to determine whether there is a progress of the ERP project. Here, "status of a content entity", "a content entity's status", or a similar phrase refers to whether or not the content entity has been developed or changed, for example, by a project developer.

Figure 1:
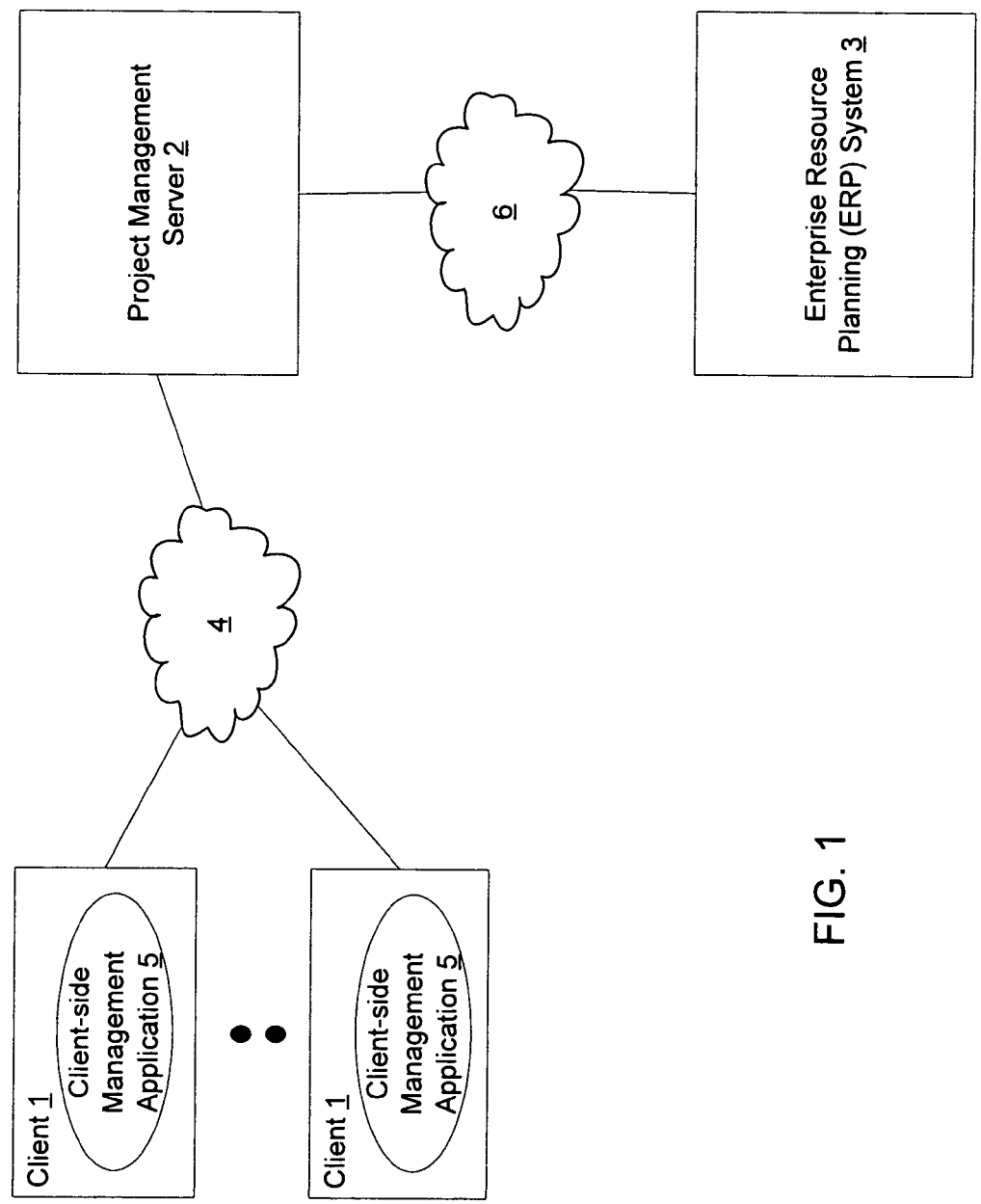
FIG. 1 illustrates a system landscape in which embodiments of the invention may be implemented.

FIG. 1 illustrates a system landscape in which embodiments of the invention may be implemented. As shown, a Project Management Server (PMS) 2 is communicatively coupled with a number of clients 1 via an interconnect 4. Each of the clients 1 includes a client-side management application 5. The PMS 2 is also coupled with an ERP system 3 via the interconnect 6. The interconnect 4 and/or 6 may be essentially any type of computer network, such as a local area network (LAN), a wide area network (WAN), metropolitan area network (MAN) or the Internet, and may implement the Internet Protocol (IP).

In one embodiment, the PMS 2 automatically tracks the changes of the ERP system 3. The PMS 2 maintains a database (not shown) recording the status of each of the content entities developed or to be developed in the ERP system 3. In a later time, the PMS 2 requests (e.g., periodically or on demand) the current status of each of the content entities. The PMS 2 compares these current statuses with the statuses previously recorded in the database to determine what progress has been made lately regarding the ERP project. Note that throughout this application, an ERP system is used as an example of an enterprise information system (EIS). However, it is not so limited; other types of EIS may be applied.

Figure 2:
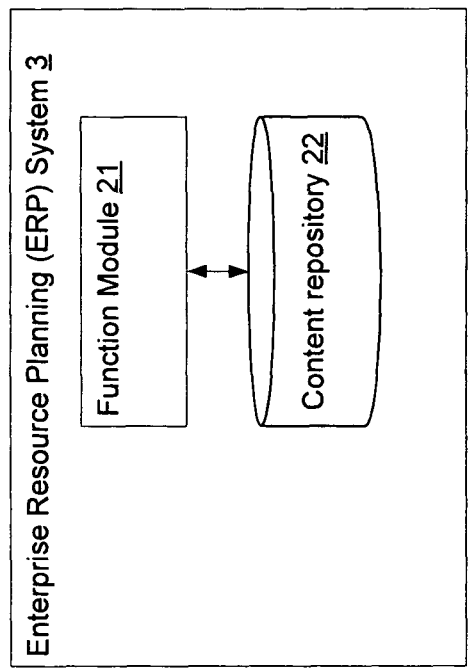
FIG. 2 illustrates an example of an architecture of the Enterprise Resource Planning (ERP) system shown in FIG. 1.

FIG. 2 illustrates an example of an architecture of the Enterprise Resource Planning (ERP) system shown in FIG. 1. As shown, the ERP system 3 maintains a content repository 22. The content repository 22 stores some or all business configuration content developed or being developed for the ERP system 3. A person with ordinary skill in the art will appreciate that the content repository 22 may be either centralized or distributed within the ERP system 3. The content repository 22 may also comprises a number of databases, flat files, etc, located locally or remotely.

The ERP system 3 also has a function module 21. The function module 21 provides an interface for an external system to access content from the content repository 22. In one embodiment, the external system may determine, via the function module 21, whether a particular content entity has already been developed. In order to do that, the external system sends the function module 21 a request including the identity of the content entity. After receiving the request and the identity of the content entity, the function module 21 determines whether a value has been set or updated for the particular content entity. The function module 21 returns the determination to the external system.

Figure 3:
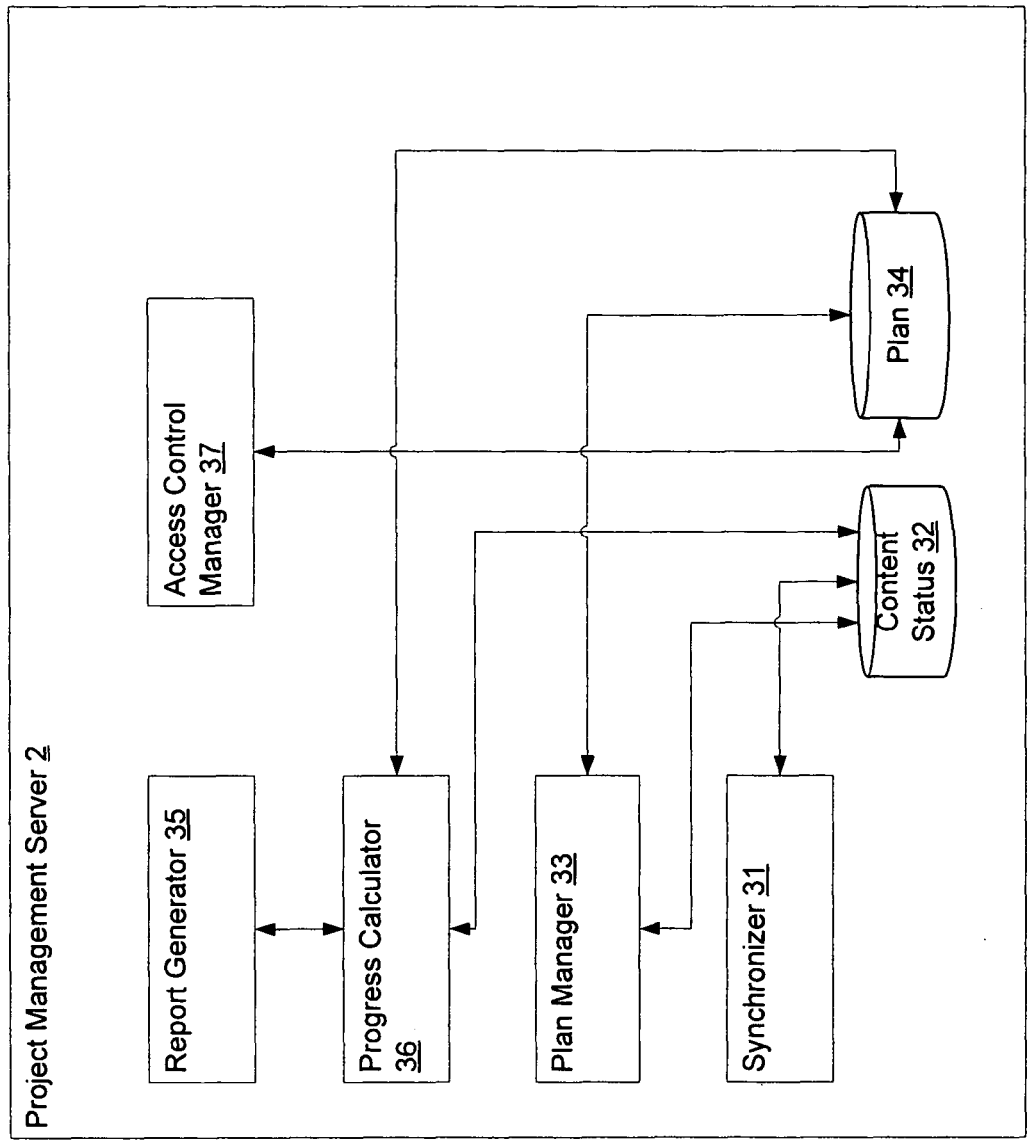
FIG. 3 illustrates an example of an architecture of the Project Management Server (PMS) shown in FIG. 1.

FIG. 3 illustrates an example of an architecture of the Project Management Server (PMS) shown in FIG. 1. As shown in FIG. 3, according to one embodiment, the PMS 2 has a synchronizer 31. The synchronizer 31 calls the function module 21 (shown in FIG. 2) of the ERP system 3 to request status information regarding one or more content entities. After receiving the status information, the synchronizer 31 updates the status of the one or more content entities maintained in the content status 32. The content status 32 may be maintained in a database. It maintains status information regarding some or all of the content entities of the ERP system 3. In one embodiment, the synchronizer 31 is scheduled to update the entries in the content status 32 periodically. Alternatively, the synchronizer 31 updates the entries in the content status 32 upon a request from, for example, a client-side management application 5. The request may be sent in response to a user input to refresh the current view of a Graphic User Interface (GUI) of the client-side management application 5.

In one embodiment, the plan manager 33 provides a function of creating, modifying and deleting a project plan. For example, a user may submit a request via a client-side management application 5 to create a new project plan. Upon receiving the request, the plan manager 33 creates a new project plan and initializes the plan. Project plans are maintained in a database, the plan 34. Note that database 32 and 34 may be implemented as a single database or multiple databases, locally or remotely.

In one embodiment, the progress calculator 36 determines whether there has been a progress and how much the progress is based on information stored in the content status 32 and/or the plan 34. In one embodiment, the progress calculator 36 calculates the progress of the development of a content category. A content category may include a plurality of related or similar content entities, or it may include other content category or categories. If a content category includes another content category, the included content category is called a sub-category of the including category. One example of content category is business configuration (BC) set.

According to one embodiment, the PMS 2 also includes a report generator 35 for generating reports in response to requests, for example, from a user via a client-side management application 5. For example, the report generator 35 communicates with the progress calculator 36 to generate a project progress report. The report generator 35 then sends the report back to the client-side management application 5 to be displayed to the user.

In order to support managing a project plan by multiple users, according to one embodiment, the PMS 2 provides an access control manager 37. The access control manager 37 insures that only one authorized user is allowed to modify a specific element of a project plan stored in plan 34. Note that each of the above described components of the PMS 2 may be implemented as software, firmware, specially designed hardware, or any combination thereof.

FIG. 4a is a block diagram illustrating an example of a data structure of a project plan. In one embodiment, a project plan 401 includes one or more objectives 402. Each objective 402 is defined to have at least one of content category 403, a goal 404 and a deadline 405. The content category 403 specifies a group of content entities 406. These content entities may be grouped together in one objective because they are related in implementing a function of the ERP system 3. It may also be that these content entities are of the same category. The goal 404 specifies a goal of the objective 402 that needs to be met. For example, the goal 404 may specify the number or percentage of content entities from the content category 403 that need to be developed. The deadline 405 specifies a time by which the goal 404 needs to be accomplished. The project plan 401 may be persistently stored in the plan 34 shown in FIG. 3.

FIG. 4b is a block diagram illustrating an example of a data structure of a content entity shown in FIG. 4a. As shown, according to one embodiment, a content entity 406 contains an ID 407, a status 408, a content category ID 409, a content type 410 and a timestamp 411 and other attributes. The status 408 indicates whether the content entity 406 has already been developed. The content type 410 specifies the category to which the content entity belongs. The timestamp 411 specifies the time the content entity 406 was developed if the content entity 406 has already been developed. If the content entity 406 has not yet been developed, the timestamp 411 may be set to a predetermined value, such as NULL. Note that the content entity 406 is maintained at the PMS 2. Therefore, status of the content entity 406 is only updated (e.g., on demand) when the synchronizer 31 calls the function module 21 of the ERP system 3 to get the latest status information regarding the content entity. As a result, the timestamp 411 of the content entity 406 does not accurately reflect the exact time the content entity's development is finished, but this does not affect the project management process as long as the synchronizer 31 updates the status before the deadline of the related objective 402. Alternatively, the content entity 406 may be updated periodically.

FIG. 4c is a block diagram illustrating an example of a mapping table which maps a content entity 406 maintained at the PMS 2 and a corresponding content entity maintained at the ERP system 3. Note that the corresponding content entity maintained at the ERP system 3 may not be developed yet. In case the corresponding content entity at the ERP system 3 has not been developed yet, the corresponding content entity can be identified, for example, by inputting the planned content entity in Plan Manager 33 with a certain naming convention for future mapping. The mapping table 412 together with the content status 32 may be used by the synchronizer 31 to synchronize the content entities' statuses. Note that the data structures or tables as shown in FIGS. 4a-4c are described for illustration purposes only. It will be appreciated that other formats may also be utilized.

Figures 5, 6:
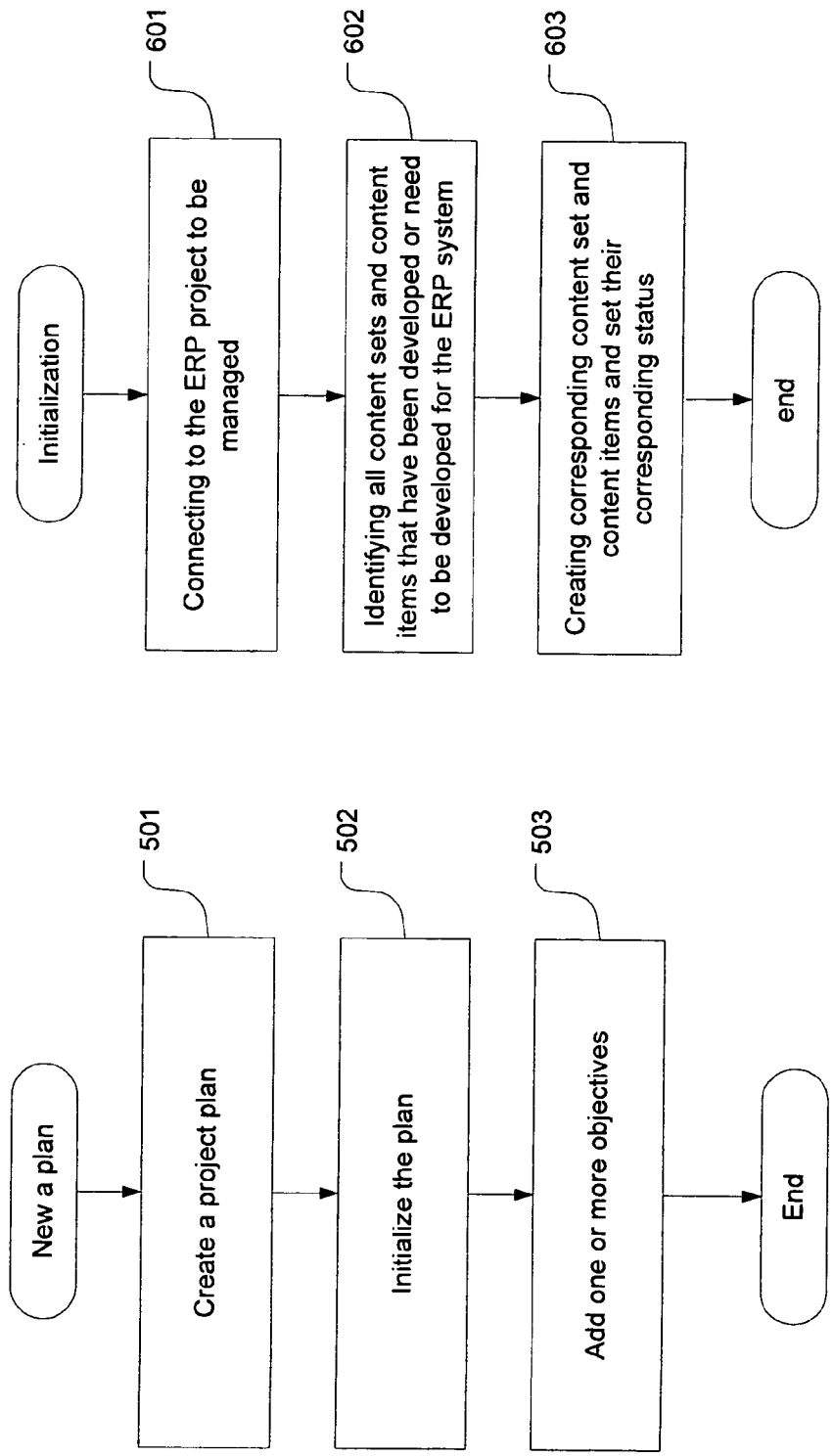
FIG. 5 is a flow diagram illustrating a process of creating a new project plan.
FIG. 6 is a flow diagram illustrating a process of initializing a newly created project plan.

FIG. 5 is a flow diagram illustrating a process of creating a new project plan according to one embodiment. Note that process of FIG. 5 may be performed by processing logic which may include software, hardware, or a combination of both. For example, process as shown in FIG. 5 may be performed by a system as shown in FIGS. 1-3. As discussed above, a client-side management application 5 may provides a GUI containing a button or a menu option allowing the user to submit a request to create a new project plan. Upon receiving the request, the plan manager 33 creates a project plan 401 (as shown in FIG. 4a) at block 501. At block 502, the plan manager 33 initializes the newly created plan 401. The initialization involves creating content categories 403 and content entities 406 for some or all corresponding content entities maintained at the ERP system 3. Details of the initialization will be introduced below. At block 503, the plan manager 33 sends information representing the newly created content categories 403 and content entities 406 to the client-side management application 5 to be displayed in a GUI to the user. The GUI may provide the function of creating an objective by selecting a content category and specifying the deadline and the goal. The user inputted information is sent to the plan manager 33 at the PMS 2. Upon receiving the information, the plan manager 33, at block 503, creates an objective 402 and adds it to the plan 401. The user may iterate the above operations to create and add more objectives into a plan.

FIG. 6 is a flow diagram illustrating a process of initializing a newly created project plan, according to one embodiment. Note that process of FIG. 6 may be performed by processing logic which may include software, hardware, or a combination of both. For example, process as shown in FIG. 6 may be performed by a system as shown in FIGS. 1-3. At block 601, the plan manager 33 of the PMS 2 calls the synchronizer 31 to connect to the ERP system 3. In order to determine which ERP system 3 to connect to, the user at the client side needs to specify the network address (or an alias name) of the ERP system 3. At block 602, the synchronizer 31 calls the function module 21 of the ERP system 3 to identify all content categories and content entities that have been developed or need to be developed for the ERP system 3. Before the content entities implemented in the system, naming convention is used to determine the ID of a certain content entity, and this entity will be implemented in ERP system 3 using the same ID. At block 603, in response to the synchronizer's response, the plan manager 33 creates content categories 402 and content entities 406 at the PMS 2 side, sets the corresponding status for each content entity, and persistently stores them into the content status 32.

FIG. 7 is a diagram illustrating a Graphic User Interface (GUI) of a client-side management application for managing a project plan. As shown, GUI component 701 specifies a content category. For example, there are four content categories shown in FIG. 7, the "scoping content", the "configuration content", the "content assignment", and the "KT Raw material". GUI component 702 specifies a sub-category. As shown, component 702 represents "KT—Fine-tuning Option" category. Each of the components 703 represents a time period (a month, for example) specifying a deadline of an objective. Component 704 represents a goal of an objective. As shown, the value of the goal is "49" meaning 49 content entities needs to be developed by the deadline. Note that the GUI is shown for illustration purposes only; more or fewer content categories may be implemented. Further, other layouts of the GUI may be implemented.

Figure 8:
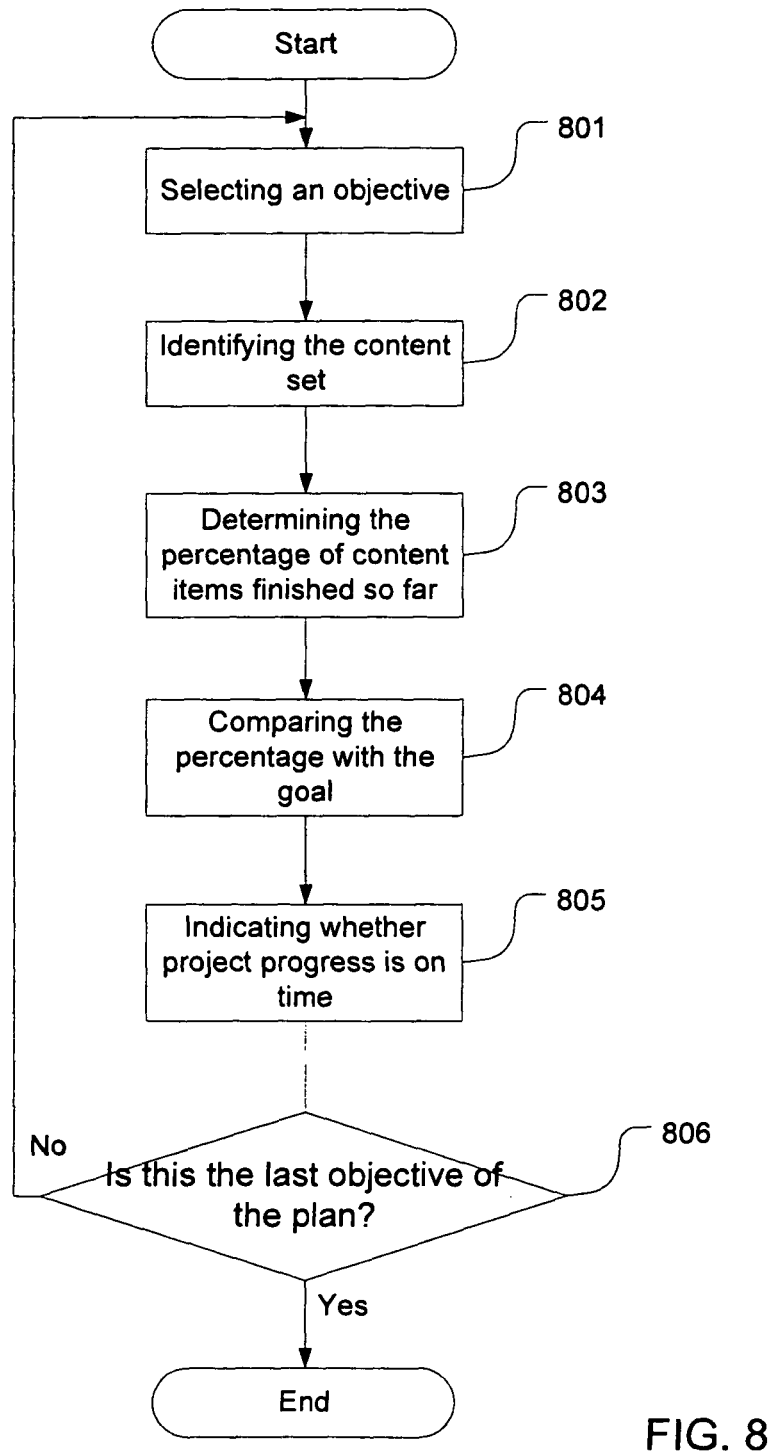
FIG. 8 is a flow diagram illustrating a process of determining a progress of a project development.

FIG. 8 is a flow diagram illustrating a process of determining a progress of a project development according to one embodiment. Note that process of FIG. 8 may be performed by processing logic which may include software, hardware, or a combination of both. For example, process as shown in FIG. 8 may be performed by a system as shown in FIGS. 1-3. At block 801, the progress calculator 36 of the PMS 2 selects an objective from all objectives of a project plan stored in the plan 34. At block 802, the progress calculator 36 identifies the content category associated with the objective. At block 803, the progress calculator 36 identifies some or all content entities in a certain category. Accessing the content status 32, the progress calculator 36 determines how many of the content entities have been already developed and how many of them have not been developed yet. If the goal of the objective is specified as a percentage, the progress calculator 36 calculates a percentage based on the number of content entities that have been developed and the total number of content entities of the category. If the goal is specified as the number of content entities that need to be developed, there is no need to calculate the percentage. At block 804, the percentage or the number of content entities already developed is compared with the goal of the objective. If the percentage or the number is lower than the goal, at block 805, the process indicates that the objective is not on time. Otherwise, the process indicates that the objective is on time. In case a report is generated, the not-on-time objective will be displayed in an obvious mode (in red color, for example) to alert a project manager. At block 806, the process determines whether this is the last objective of the project plan. If yes, the process ends. Otherwise, the process goes back to block 801.

Figure 9:
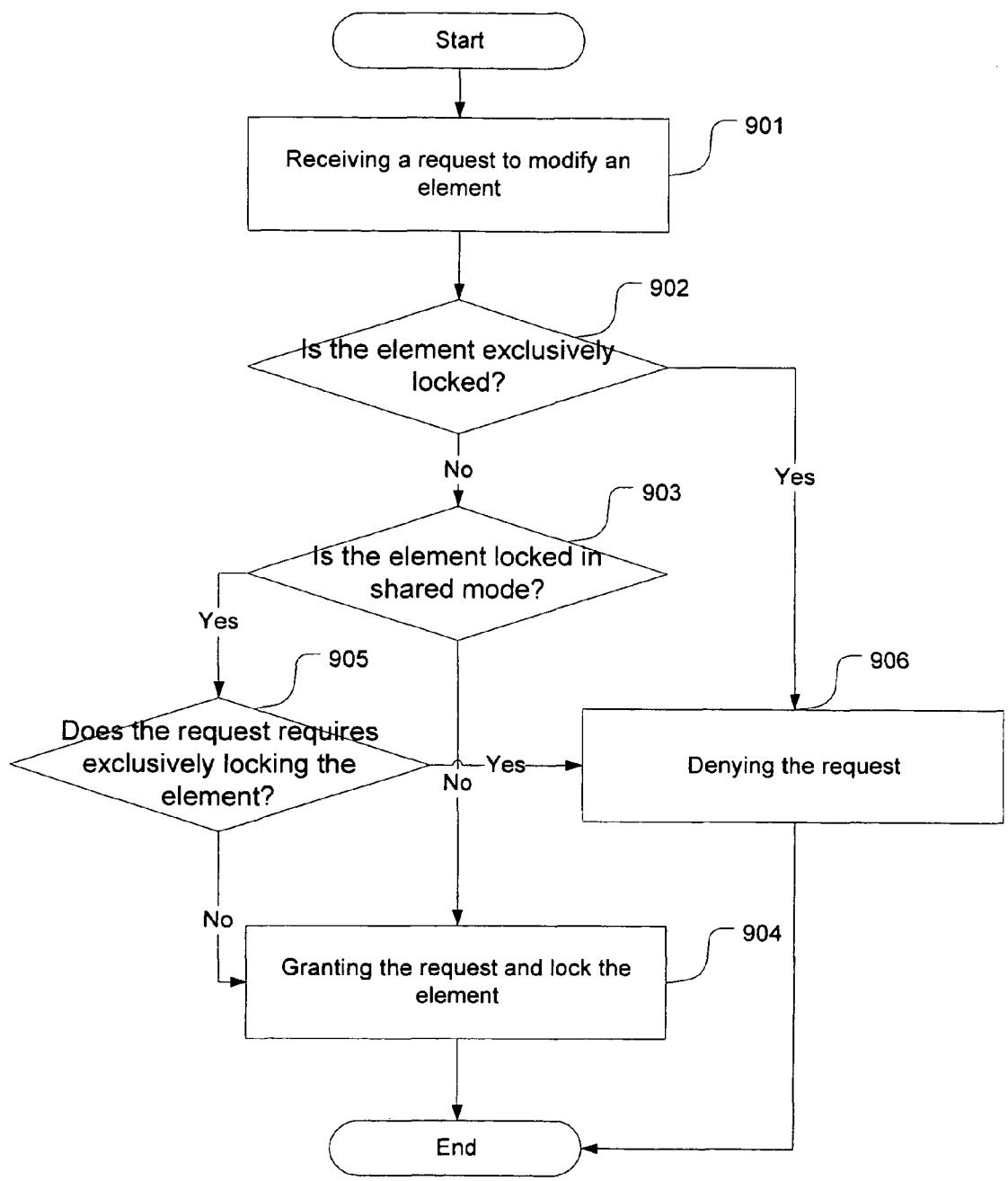
FIG. 9 is a flow diagram illustrating a process of controlling access to an element of a project plan.

In order to support managing a project plan by multiple users, according to one embodiment, the PMS 2 provides an access control manager 37. The access control manager 37 insures that only one authorized user is allowed to modify a specific element of a project plan stored in plan 34. An element of a project plan may be, for example, a goal of an objective, a deadline of an objective, etc. FIG. 9 is a flow diagram illustrating a process of controlling access to an element of a project plan, according to one embodiment. Note that process of FIG. 9 may be performed by processing logic which may include software, hardware, or a combination of both. For example, process as shown in FIG. 9 may be performed by a system as shown in FIGS. 1-3. At block 901, the PMS 2 receives a request to modify an element of a project plan. For example, a user on the client side may change the goal of an objective via a GUI of a client-side management application. The user may submit the change to the PMS 2 by clicking a submit button or submitting a command. At block 902, the access control manager 37 of the PMS 2 determines whether the element being requested is exclusively locked by another request. In one embodiment, an element is exclusively locked in response to a request to modify the element (a write command, for example). If the required element is exclusively locked, then the request is denied at block 906. If the element is not exclusively locked, then at block 903, the access control manager 37 determines whether the required element is locked in a shared mode. If the element is not locked as a shared mode, at block 904, the request is granted and the element is locked accordingly depending on the nature of the access request. For example, if the request is to modify the element, then the element is exclusively locked. If the request is a read request, then the element is locked in a shared mode. If the access control manager 37 determines that the required element is locked in a shared mode at block 903, then at block 905, the access control manager 37 determines whether the request needs to lock the element exclusively. If so, the request is denied at block 906. Otherwise, at block 904, the request is granted but another shared lock is added to the required element. When the request is finished, only the corresponding lock is unlocked.

Figure 10:
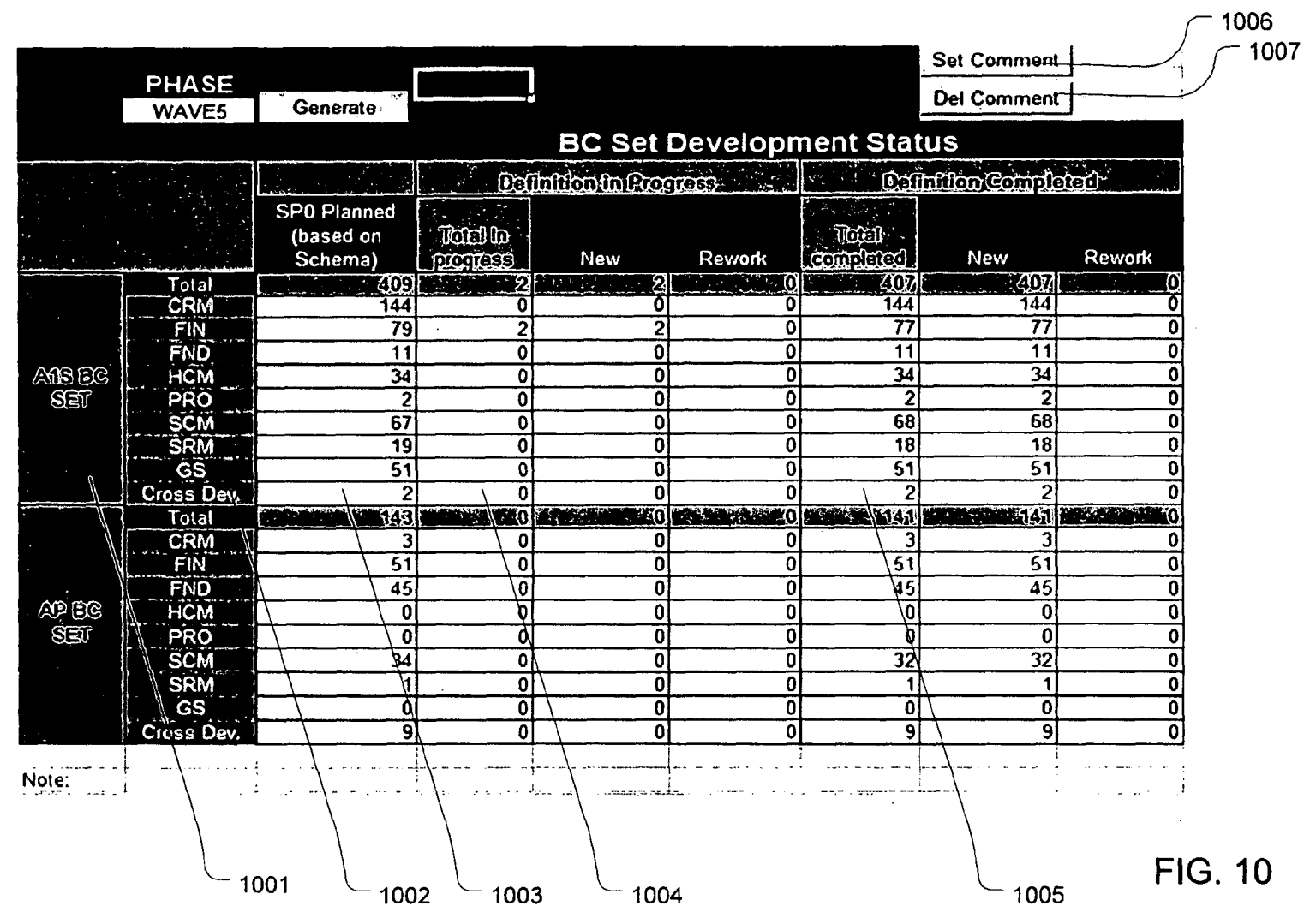

FIG. 10 is a diagram illustrating an example of a report generated by the project management system, according to one embodiment. As shown, GUI component 1001 represents a content category (a BC set, for example). GUI component 1002 represents sub-category of GUI component 1001. GUI component 1003 represents the planned number (goal) of content entities in the corresponding sub-category represented by GUI component 1002. As shown, there are two content entities in the sub-category represented by GUI component 1002. GUI component 1004 represents the number of content entities of which the development is in progress. As shown, there is no content entity of which the development is in progress. GUI component 1005 represents the number of content entities of which the development is completed. As shown, there are two content entities of which the development is completed. Thus, the report as shown in FIG. 10 may present a progress of an ERP project by showing the development progress of the content entities of each category. A user (a project manager, for example) may easily identify which part of the content development needs more work and which part has progressed more quickly. In addition, the report may contain a button 1006 allowing a user to input a comment regarding the status of the development of the ERP project. Button 1007 allows the user to delete the comment added previously. Note that GUI as shown in FIG. 10 is illustrated for illustration purposes only. More or fewer content entities, as well as other layouts may also be implemented.

Figure 11:
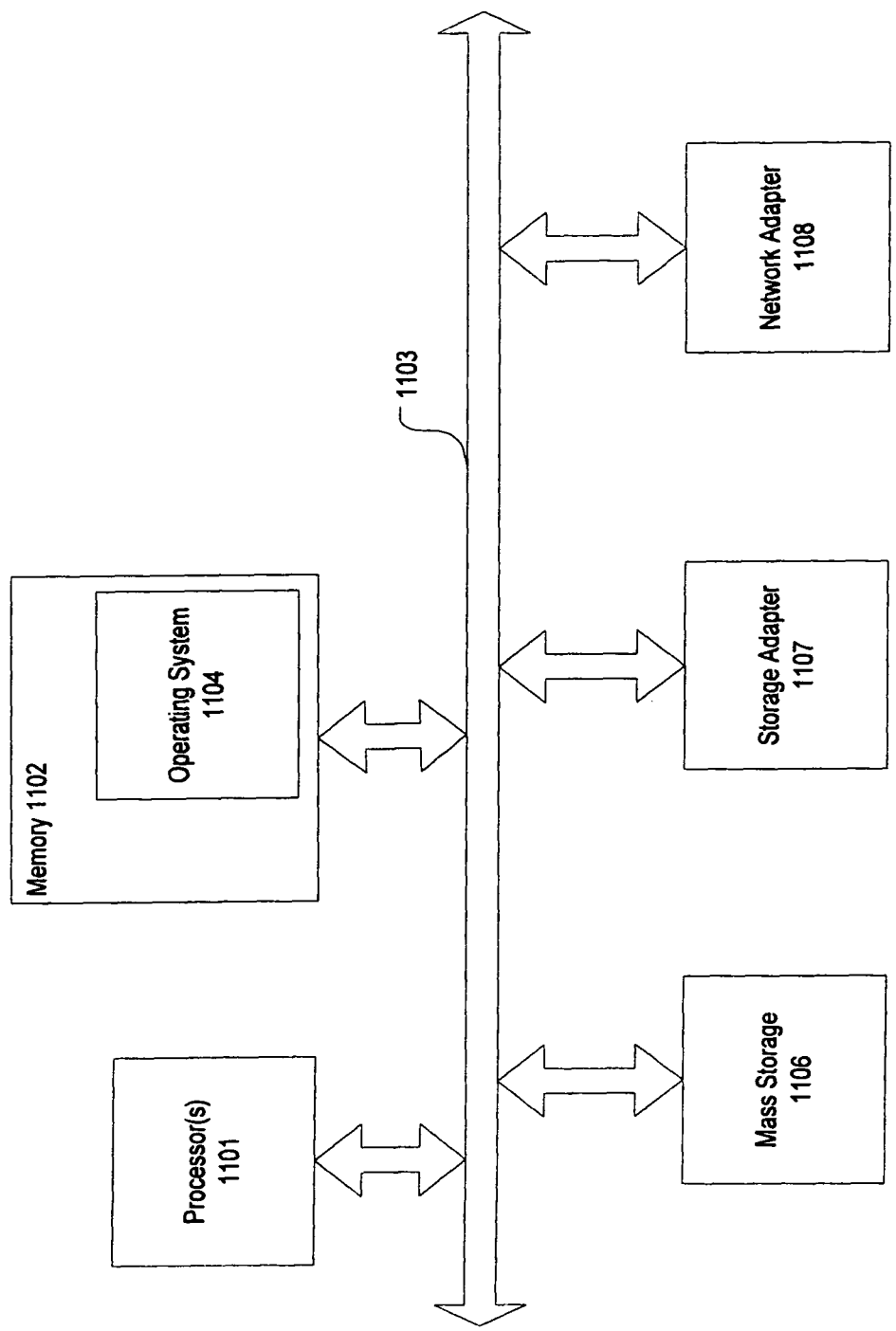
FIG. 11 is a high-level block diagram showing an example of the hardware architecture of a processing system.

FIG. 11 is a high-level block diagram showing an example of the hardware architecture of a processing system. The hardware architecture may apply to both the clients 1 and/or the PMS 2 of FIG. 1. Certain standard and well-known components which are not germane to the present invention are not shown. The processing system includes one or more processors 1101 coupled to a bus system 1103.

The bus system 1103 in FIG. 3 is an abstraction that represents any one or more separate physical buses and/or point-to-point connections, connected by appropriate bridges, adapters and/or controllers. The bus system 1103, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 1101 are the central processing units (CPUs) of the processing system and, thus, control the overall operation of the processing system. In certain embodiments, the processors 1101 accomplish this by executing software stored in memory 1102. A processor 1101 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 1102 coupled to the bus system 43. The memory 1102 represents any form of random access memory (RAM), read-only memory (ROM), flash memory, or a combination thereof. Memory 1102 stores, among other things, the operating system 1104 of processing system.

Also connected to the processors 1101 through the bus system 1103 are a mass storage device 1106, a storage adapter 1107, and a network adapter 1108. Mass storage device 1106 may be or include any conventional medium for storing large quantities of data in a non-volatile manner, such as one or more disks. The storage adapter 1107 allows the processing system to access a storage subsystem and may be, for example, a Fibre Channel adapter or a SCSI adapter. The network adapter 1108 provides the processing system with the ability to communicate with remote devices over a network and may be, for example, an Ethernet adapter or a Fibre Channel adapter.

Memory 1102 and mass storage device 1106 store software instructions and/or data, which may include instructions and/or data used to implement the techniques introduced here.

Thus, a method and system for managing an ERP project have been described.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:

maintaining, by a project management server implemented on a first system comprising a first programmable processor, a content status database comprising data representing a status of each content entity of a plurality of content entities in an enterprise resource planning system, the enterprise resource planning system being separate from the first system and comprising a second programmable processor, the enterprise resource planning system maintaining a content repository storing the plurality of content entities that each comprise business configuration content developed or in development for the enterprise resource planning system according to business requirements of a customer for whom the enterprise resource planning system is configured or is being configured;

defining, as part of a project plan maintained by the project management server in a plan database for developing the business configuration content, an objective comprising a content category of a plurality of content categories, a goal, and a deadline, the content category specifying a group of related or similar content entities from the plurality of content entities, the goal comprising a specified number or percentage of content entities of the content category that need to be developed, and the deadline comprising a specified time by which the at least one goal needs to be accomplished;

requesting, by a call from a synchronizer module at the project management server to a function module at the enterprise resource planning system, updated status information regarding a particular content entity of the plurality of content entities in the content repository, the function module providing an interface for the external system to access the content repository, the requesting comprising sending an identity of the particular content entity;

assessing a current status of the particular content entity received by the synchronizer module as part of a response from the function module with the status of the particular content entity in the content status database, the response received by the synchronizer module from the function module comprising a determination of whether a value has been set or updated for the particular content entity in the content repository maintained by the enterprise resource system, the assessing comprising updating the status of the particular content entity in the content status database if the response indicates that the value has been set or updated in the content repository for the particular content entity;

quantifying, by the project management server based on the data in the content status database, an objective completion status of the objective, the quantifying comprising querying the content status database to determine whether the specified of the number or percentage of content entities in the content category have been developed in relation to the goal and the deadline; and generating a report, based on the quantifying, the report indicating a completion status of the objective in relation to the goal and the deadline.

2. The method of claim 1, wherein the business configuration content comprises the plurality of content categories.

3. The method of claim 1, wherein the content category comprises a content sub-category.

4. The method of claim 1, wherein a content entity in the plurality of content entities is considered as developed for the project if the value is set for the content entity.

5. A non-transitory computer-readable medium having instructions, when executed, cause a machine to perform operations comprising:

maintaining, by a project management server implemented on a first system comprising a first programmable processor, a content status database comprising data representing a status of each content entity of a plurality of content entities in an enterprise resource planning system, the enterprise resource planning system being separate from the first system and comprising a second programmable processor, the enterprise resource planning system maintaining a content repository storing the plurality of content entities that each comprise business configuration content developed or in development for the enterprise resource planning system according to business requirements of a customer for whom the enterprise resource planning system is configured or is being configured;

defining, as part of a project plan maintained by the project management server in a plan database for developing the business configuration content, an objective comprising a content category of a plurality of content categories, a goal, and a deadline, the content category specifying a group of related or similar content entities from the plurality of content entities, the goal comprising a specified number or percentage of content entities of the content category that need to be developed, and the deadline comprising a specified time by which the at least one goal needs to be accomplished;

requesting, by a call from a synchronizer module at the project management server to a function module at the enterprise resource planning system, updated status information regarding a particular content entity of the plurality of content entities in the content repository, the function module providing an interface for the external system to access the content repository, the requesting comprising sending an identity of the particular content entity;

assessing a current status of the particular content entity received by the synchronizer module as part of a response from the function module with the status of the particular content entity in the content status database, the response received by the synchronizer module from the function module comprising a determination of whether a value has been set or updated for the particular content entity in the content repository maintained by the enterprise resource system, the assessing comprising updating the status of the particular content entity in the content status database if the response indicates that the value has been set or updated in the content repository for the particular content entity;

quantifying, by the project management server based on the data in the content status database, an objective completion status of the objective, the quantifying comprising querying the content status database to determine whether the specified of the number or percentage of content entities in the content category have been developed in relation to the goal and the deadline; and generating a report, based on the quantifying, the report indicating a completion status of the objective in relation to the goal and the deadline.

6. The computer-readable medium of claim 5, wherein the business configuration content comprises the plurality of content categories.

7. The computer-readable medium of claim 5, wherein the content category comprises a content sub-category.

8. The computer-readable medium of claim 5, wherein a content entity in the plurality of content entities is considered as developed for the project if the value is set for the content entity.

9. A system comprising:

a project management server including at least one processor;

at least one memory coupled to the at least one first programmable processor and storing instructions that, when executed by the at least one first programmable processor, cause the at least one first programmable processor to perform operations comprising;

maintaining, by a project management server implemented on a first system comprising a first programmable processor, a content status database comprising data representing a status of each content entity of a plurality of content entities in an enterprise resource planning system, the enterprise resource planning system being separate from the first system and comprising a second programmable processor, the enterprise resource planning system maintaining a content repository storing the plurality of content entities that each comprise business configuration content developed or in development for the enterprise resource planning system according to business requirements of a customer for whom the enterprise resource planning system is configured or is being configured;

defining, as part of a project plan maintained by the project management server in a plan database for developing the business configuration content, an objective comprising a content category of a plurality of content categories, a goal, and a deadline, the content category specifying a group of related or similar content entities from the plurality of content entities, the goal comprising a specified number or percentage of content entities of the content category that need to be developed, and the deadline comprising a specified time by which the at least one goal needs to be accomplished;

requesting, by a call from a synchronizer module at the project management server to a function module at the enterprise resource planning system, updated status information regarding a particular content entity of the plurality of content entities in the content repository, the function module providing an interface for the external system to access the content repository, the requesting comprising sending an identity of the particular content entity;

assessing a current status of the particular content entity received by the synchronizer module as part of a response from the function module with the status of the particular content entity in the content status database, the response received by the synchronizer module from the function module comprising a determination of whether a value has been set or updated for the particular content entity in the content repository maintained by the enterprise resource system, the assessing comprising updating the status of the particular content entity in the content status database if the response indicates that the value has been set or updated in the content repository for the particular content entity;

quantifying, by the project management server based on the data in the content status database, an objective completion status of the objective, the quantifying comprising querying the content status database to determine whether the specified of the number or percentage of content entities in the content category have been developed in relation to the goal and the deadline; and generating a report, based on the quantifying, the report indicating a completion status of the objective in relation to the goal and the deadline.

10. The system of claim 9, wherein the content category comprises a plurality of sub-categories, each of the plurality of sub-categories comprising a subset of the plurality of content entities.

* * * * *